United States Patent Office 3,819,674
Patented June 25, 1974

---

3,819,674
PROCESS FOR THE PRODUCTION OF ACETOXYSILYLETHYL-SUBSTITUTED ORGANOPOLYSILOXANES
Karl-Heinz Rudolph, Cologne-Stammheim, Werner Buchner, Leichlingen, and Walter Noll, Opladen, Germany, assignors to Bayer Aktiengesellschaft, Leverkusen, Germany
No Drawing. Continuation-in-part of abandoned application Ser. No. 230,938, Mar. 1, 1972. This application Mar. 28, 1973, Ser. No. 345,816
Claims priority, application Germany, Mar. 10, 1971, P 21 11 413.6; Feb. 20, 1973, P 23 08 238.4
Int. Cl. C07f 7/08
U.S. Cl. 260—448.2 E                    4 Claims

---

ABSTRACT OF THE DISCLOSURE

Acetoxysilylethyl-substituted organopolysiloxanes having a high content of functional substituents, corresponding to the general formula

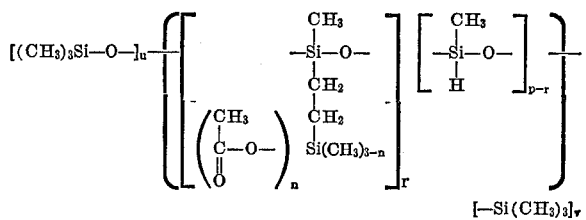

in which $p$ is an integer from 3 to 100 inclusive;
$r$ is an integer in the range of from $p/2$ to $p$;
$u$ and $v$ have the same value, this value being zero or one;
$n$ is 2 or 3;

are produced by reacting a vinylacetoxysilane of the general formula

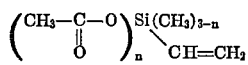

with a methyl-hydrogen-polysiloxane of the general formula

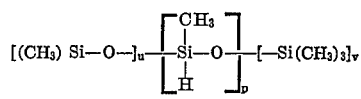

in the presence of a platinum catalyst, according to the invention, in a new manner which comprises intimately mixing the two reactants in a proportion of 0.98 to 1.1 mol vinylacetoxysilane per each gram atom of Si-bound hydrogen to be reacted in the methyl-hydrogen-polysiloxane, with one another and with the catalyst at room temperature; allowing the mixture to flow through a reaction zone heated to a temperature of between 180 and 200° C. at such a speed that the time of residence of the reaction mixture in the heated zone is 30 to 60 seconds; and rapidly cooling the product flowing from the reaction zone to a temperature of below 50° C.

The products are especially suitable for coatings because they react very readily with atmospheric humidity, thereby forming resinous solid products.

---

This application is a continuation-in-part of our copending application Ser. No. 230,938, filed Mar. 1, 1972, now abandoned and assigned to the same assignee as the present invention.

The present invention relates to the production of polyfunctional organopolysiloxanes which contain Si-bound di- or tri-(acetoxy)-silylethyl radicals as characteristic substituents.

These organopolysiloxanes correspond to the general formula

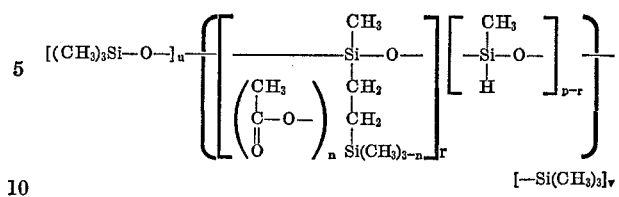

in which (and in the subsequent formulae)

$p$ is an integer from 3 to 100 inclusive;
$r$ is an integer in the range from $p/2$ to $p$;
$n$ and $v$ have the same value, this value being zero or one;
$n$ is 2 or 3.

The above defined compounds react very readily with water, especially with the water vapor present in atmospheric air, splitting off acetic acid, and they form resinous solid products, with siloxane condensation. They are therefore especially suitable as agents for the production of organopolysiloxane coatings.

Compounds which have a composition similar to that illustrated by the above formula are known, for example from U.S. Patent Specification No. 3,455,878. The process for the production of those compounds, as described in Example 2, Nos. 8 and 9 of that specification, is carried out batchwise by gradually adding a vinylacetoxysilane to a heated mixture of a polyorgano-hydrogen-siloxane and a platinum catalyst and in this way causing it to react at temperatures of between 130 and 215° C. under addition of the H-Si compound on to the unsaturated radical of the vinylacetoxysilane. In the disclosed cases, however, the proportion of acetoxysilyl-ethylsiloxane units in the reaction product amounts only to 2 to 8%, with 98 to 92% methyl-hydrogensiloxane units. That means, in the formula given above, $r$ would have values of from $0.02p$ to $0.08p$.

Any attempt to subject substantially more vinylacetoxysilane to the H-Si addition by means of the known method fails, since the reaction product is unstable at an elevated temperature, this being more so, the greater the number of acetoxyl radicals in a molecule becomes. With the splitting off of acetic anhydride there are formed undesirable new siloxane bonds which lead to gel-like crosslinking. On the other hand, a temperature above 120° C. is required, as otherwise the reaction would not proceed to completion.

A way as now been found however, to obviate the disadvantageous effect of the reaction temperatures required, i.e. the decomposition of the addition products, even if the resultant organopolysiloxanes are very rich in acetoxylated siloxane units, that is to say if they have 50 or more units of this kind per 100 of all their siloxane units. According to our experimental investigaitons, such compounds, although claimed in the above mentioned U.S. Patent, cannot be produced by the method disclosed in that specification.

According to the invention a process for the production of the acetoxysilylethyl-substituted organopolysiloxanes of the above general formula, by the reaction of a vinylacetoxysilane of the general formula

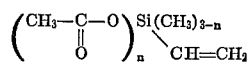

with a methyl-hydrogen-polysiloxane of the general formula

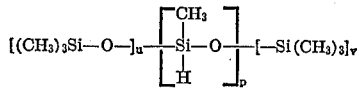

in the presence of a platinum catalyst with heating to a temperature above 120° C., is characterized in that the two reactants are intimately mixed with one another and with the catalyst at room temperature, in a proportion of 0.98 to 1.1 mol, preferably 1 to 1.01 mol, vinylacetoxysilane per gram atom of that part of Si-bound hydrogen in the methyl-hydrogen-polysiloxane which has been stoichiometrically calculated for the desired value of r; that the mixture is allowed to flow through a reaction zone heated to a temperature of between 180 and 200° C. at such a speed that the time of residence of the reaction mixture in the heated zone is 30 to 60 seconds, preferably 40 to 45 seconds; and that the product flowing from the reaction zone is rapidly cooled to a temperature below 50° C.

Preferred methyl-hydrogen-polysiloxanes to be used in the present process include α,ω-bis-(trimethylsiloxy)-polymethyl-hydrogen-siloxanes of the stated formula wherein $p=35$ to 40 and $u=v=1$, and cyclotetra- or cyclopentamethyl-hydrogen-siloxanes of the stated formula wherein $p=4$ or 5 and $u=v=0$.

Platinum catalysts which can be used for the addition process are known and include, for example, hexachloroplatinic acid. For obviating side reactions, especially the splitting off of Si-bound hydrogen, the hexamethyl-dipyridine-diiodo-diplatinum described in our U.S. Patent Specification 3,567,755 has proved particularly advantageous.

The following Examples are given for the purpose of illustrating the invention.

EXAMPLE 1

A device is used which essentially consists of a vertical heatable coil tube (coil tube condenser, length of tube 5 m., bore 6 mm.), the upper end of which is connected to a storage container (dropping funnel) fitted with rapid stirrer and the lower end of which opens into a receiver fitted with a nitrogen feed.

The coil tube is heated to 180° C. and blown through with nitrogen. The stirrer-container is charged with 116 g. vinyltriacetoxysilane, 32 g. of an α,ω-bis-(trimethylsiloxy)-polymethyl-hydrogen-siloxane the chains of which consist, on average, of 37 siloxane units, and with an amount of hexamethyl-dipyridine-diiodo-diplatinum containing 3 mg. Pt; these components are thoroughly mixed at room temperature and the mixture is then allowed to trickle through the hot coil tube, the dropping rate being regulated so that the time of resistence of the liquid in the tube is about 40 seconds. From the collected product (145 g.) which is obtained in this way in the course of 20 minutes, the volatile components are evaporated at 60° C. and 0.4 mm. Hg; there remain 143 g. of a liquid of 400 cp. viscosity at 20° C. and high sensitivity to moisture. Analysis shows 57.4 percent by weight of $CH_3CO_2$; that implies, according to the general formula given above, for the index $p=35$ a value of $r=30$, i.e. $0.86p$.

EXAMPLE 2

The procedure is the same as that described in Example 1, the only modification being that the vinyl-triacetoxysilane is replaced with 94 g. methylvinyl-diacetoxysilane. An analogous product is obtained the analysis of which gives 45.4 percent by weight $CH_3CO_2$; that implies in the above mentioned formula (when $p=35$) a value of the index $r$ of 32, i.e. $0.91p$.

COMPARATIVE EXPERIMENTS

With the reaction components used in Example 1, a reaction experiment was carried out according to the previously known method as follows: A flask of 250 ml. capacity, and fitted with stirrer, dropping funnel, reflux condenser with drying tube, thermometer and nitrogen feed, was charged with 32 g. of the same α,ω-bis-(trimethylsiloxy)-polymethyl-hydrogen-siloxane as in the Examples and with an amount of hexamethyl-dipyridine-diiodo-diplatinum containing 3 mg. Pt, and the mixture was heated to 120° C. with stirring and with the introduction of nitrogen. 116 g. vinyltriacetoxysilane were then added dropwise (5 g. per minute) to the mixture while the temperature was slowly raised to 135° C. During this operation, the initially thinly liquid reaction mixture became visibly thickly liquid and had been transformed into a gel even before the addition of the acetoxysilane was completed.

The same useless result was obtained in a further experiment where the reaction components had been interchanged, i.e. the vinyl-triacetoxysilane with the platinum catalyst was placed into the flask and the polymethyl-hydrogen-siloxane was added dropwise.

Attempts to obviate gel formation by maintaining a constant temperature of 120° C. likewise failed in that the desired addition reaction started at first but came to a halt, even before the components were completely combined.

What we claim is:

1. A process for the production of acetoxysilylethyl-substituted organopolysiloxanes of the general formula

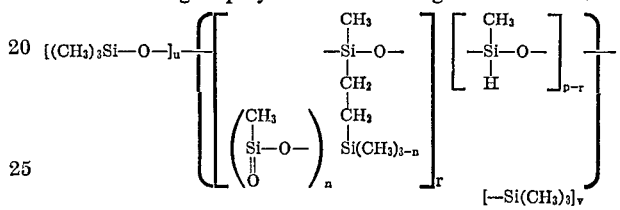

in which $p$ is an integer from 3 to 100 inclusive;

$r$ is an integer in the range of from $p/2$ to $p$;

$u$ and $v$ have the same value, this value being zero or one;

$n$ is 2 or 3;

by reacting a vinylacetoxysilane of the general formula

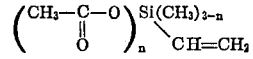

with a methyl-hydrogen-polysiloxane of the general formula

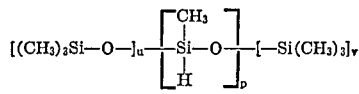

in the presence of a platinum catalyst at a temperature above 120° C., which process comprises intimately mixing said two reactants with one another and with the catalyst at room temperature in a proportion of 0.98 to 1.1 mol vinylacetoxysilane per gram atom of that part of Si-bound hydrogen in the methyl-hydrogen-polysiloxane which has been stoichiometrically calculated for the desired value of $r$; allowing the mixture to flow through a reaction zone heated to a temperature of between 180 and 200° C. at such a speed that the time of residence of the reaction mixture in the heated zone is 30 to 60 seconds; and rapidly cooling the product flowing from the reaction zone to a temperature of below 50° C.

2. A process according to claim 1 wherein the methyl-hydrogen-polysiloxane is one in which $p=35$ to 40 and $u=v=1$.

3. A process according to claim 1 wherein the methyl-hydrogen-polysiloxane is one in which $p=4$ or 5 and $u=v=0$.

4. A process according to claim 1 in which the catalyst is hexamethyl-dipyridine-diiodo-diplatinum.

References Cited

UNITED STATES PATENTS

| | | | |
|---|---|---|---|
| 3,470,225 | 9/1969 | Knorre et al. | 260—448.2 E |
| 3,567,755 | 3/1971 | Seyfried et al. | 260—448.2 E |
| 3,631,086 | 12/1971 | Seyfried et al. | 260—448.2 E |

DANIEL E. WYMAN, Primary Examiner

P. F. SHAVER, Assistant Examiner

U.S. Cl. X.R.

260—46.5 R

UNITED STATES PATENT OFFICE
CERTIFICATE OF CORRECTION

Patent No. 3,819,674   Dated June 25, 1974

Inventor(s) Karl-Heinz Rudolph et al

It is certified that error appears in the above-identified patent and that said Letters Patent are hereby corrected as shown below:

Column 4, in the first formula starting at line 20

The formula in the parenthesis reads 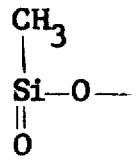

It should be: 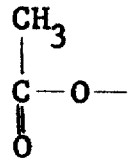

Signed and sealed this 29th day of October 1974.

(SEAL)
Attest:

McCOY M. GIBSON JR.                    C. MARSHALL DANN
Attesting Officer                       Commissioner of Patents